Aug. 3, 1954  J. E. TAYLOR  2,685,163
FRUIT PICKING DEVICE
Filed Dec. 13, 1951
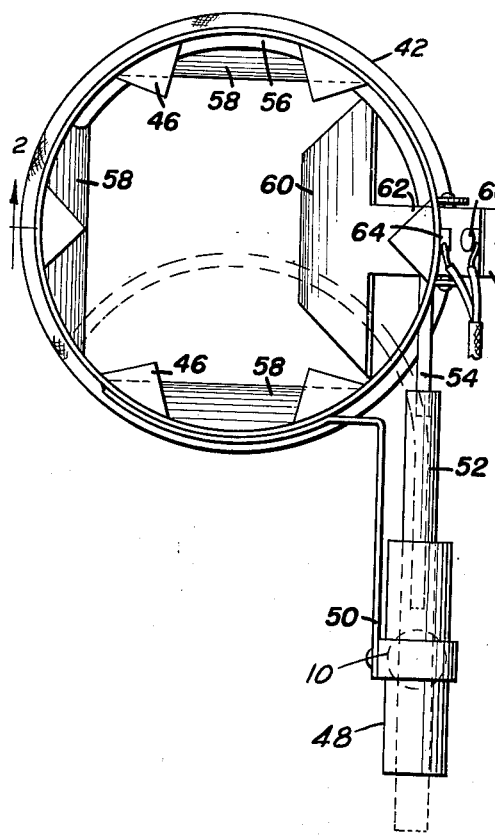
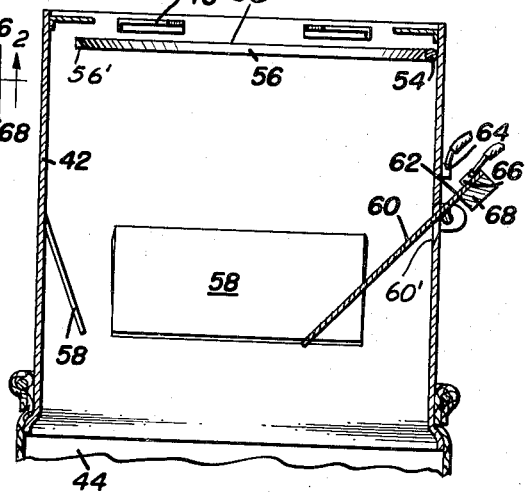
Joseph E. Taylor
INVENTOR.

Patented Aug. 3, 1954

2,685,163

UNITED STATES PATENT OFFICE 2,685,163

FRUIT PICKING DEVICE

Joseph E. Taylor, De Land, Fla., assignor of nine per cent to Cecil M. Peek, nine per cent to Margaret T. Peek, ten per cent to Joe T. Peek, ten per cent to Leon A. Peek, and ten per cent to Margaret V. Peek, all of West Palm Beach, Fla.

Application December 13, 1951, Serial No. 261,404

3 Claims. (Cl. 56—338)

This invention relates to new and useful improvements in mechanical fruit pickers and the primary object of the present invention is to provide a fruit picking device that is slipped upwardly over fruit and which embodies a novel and improved means which will effectively cut the branches and/or strip the fruit from the branches.

Another important object of the present invention is the provision of a mechanical fruit picker including a solenoid actuated blade or jaw member that is connected to a switch located to be engaged by fruit received in the picker, whereby the fruit will actuate the branch cutting or fruit stripping means.

A further object of the present invention is to provide a fruit picking device that is extremely small and compact in structure to be easily carried and manipulated by a single operator and which includes an automatically actuated stripping or cutting means activated by fruit over which the device is manually placed.

A still further aim of the present invention is to provide a fruit picker of the aforementioned character that is simple and practical in construction, strong and reliable in use, efficient and durable in operation, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the invention in a preferred form, and

Figure 2 is a vertical sectional view taken on the plane of section line 2—2 of Figure 1.

Referring now to the drawings in detail, for the purpose of illustration, there is disclosed therein one preferred embodiment of the present invention.

In this embodiment, an open ended cylindrical casing 42 is secured at its lower end to a bag or container 44. Circumferentially spaced teeth 46 are struck from the upper portion of the casing and extend radially inwardly from the peripheral wall of the casing.

The casing is secured to a solenoid 48 by a clamp bracket 50 which in turn is secured to a handle such as 10. The operating core 52 of the solenoid is secured to an arm 54 having a curved end 56 that extends into the casing through an arcuate horizontal slot 56′ in the casing.

Downwardly and inwardly inclined guide plates 58 in the casing 42 are mounted on the lower portion of the casing 42 and circumferentially spaced around the same. An operating plate or arm 60 is positioned in the casing 42 between an adjacent pair of the plates 58 and includes a central laterally projecting portion 62 that projects outwardly through a slot 60′ in the casing and which is pivoted to the casing.

Casing 42 supports a stationary contact 64 that opposes a contact 66 carried by portion 62 and forms with contact 64 a switch. A weight 68 is also carried by portion 62 normally retaining plate 60 raised and contact 66 disengaged from contact 64. The contacts 64 and 66 are operatively associated with the solenoid 48 so that when engaged said contacts will cause the solenoid to be energized from any suitable electric circuit, not shown.

In practical use of the device shown in Figures 1 and 2, the casing 42 is slipped upwardly over fruit bearing branches or stems and as the fruit engages and lowers the plate 60, contact 66 will engage contact 64 so that the solenoid will be rendered operative to cause retraction of core 52 and movement of the arm 56 transversely of casing 42 as shown in broken lines in Figure 1. Arm 56 is preferably provided with a sharp edge which coacts with certain of the teeth 46 upon such movement of said arm 56 and thereby cuts or severs the branch.

Having described the invention, what is claimed as new is:

1. A fruit picking device comprising an open ended casing adapted to be slipped upwardly over fruit to be picked, teeth in said casing for severing the stems of the fruit, a jaw in said casing operative toward said teeth to engage the stems with the teeth for severing said stems, a solenoid mounted on said casing and operatively connected to said jaw, a fruit engaging plate in said casing and pivoted thereto for swinging in one direction by the fruit engaging the same, and normally disengaged contacts on said casing and plate, respectively, operatively associated with said solenoid and engageable by swinging of said plate in said direction.

2. A fruit picking device according to claim 1, and guide plates in said casing for guiding the fruit into engagement with said plate.

3. A fruit picking device according to claim 1, and counterbalance means on said plate for swinging said plate in the opposite direction to normally disengage said contacts.

References Cited in the file of this patent

UNITED STATES PATENTS

| Number | Name | Date |
|---|---|---|
| 297,334 | Brooks | Feb. 5, 1889 |
| 424,934 | Peck | Apr. 1, 1890 |
| 427,112 | Peaves | May 6, 1890 |
| 1,006,124 | Pindell | Oct. 17, 1911 |
| 1,191,954 | Elkins | July 25, 1916 |
| 1,225,097 | Young | May 8, 1917 |
| 1,307,417 | Powers | June 24, 1919 |
| 2,179,031 | Bustetter et al. | Nov. 7, 1939 |
| 2,246,747 | Metzger | June 24, 1941 |
| 2,545,072 | Denman | Mar. 13, 1951 |